United States Patent Office 3,497,443
Patented Feb. 24, 1970

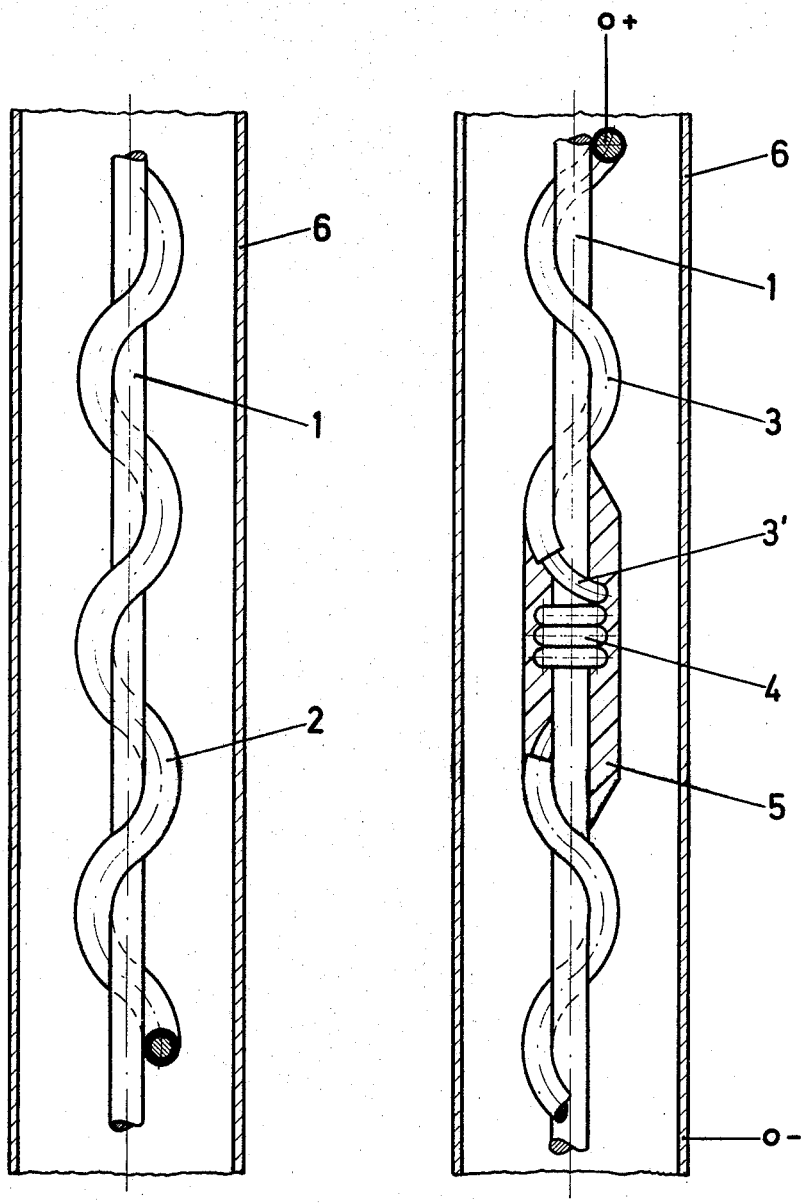

3,497,443
INTERNAL ANODE FOR THE CATHODIC RUST
PROTECTION OF PIPELINES
Jochen-Werner Kuhn von Burgsdorff, Hanau, Germany,
assignor to W. C. Heraeus G.m.b.H., Hanau, Germany
Filed Apr. 12, 1967, Ser. No. 630,442
Claims priority, application Germany, Apr. 16, 1966,
H 55,241; Apr. 20, 1966, H 55,261
Int. Cl. C23f 13/00; C23b 7/04; B01k 3/04
U.S. Cl. 204—196                                2 Claims

ABSTRACT OF THE DISCLOSURE

An insulation and spacing element for an anode wire within a pipeline consisting either of a tubular or solid rod or cord of plastic or of an insulated conductor which is wound in the form of a wide spiral continuously around the entire length of the anode wire and prevents any possible contact between the anode wire and the wall of the pipe. When employing an insulated conductor as a spacing and insulating element, it may serve additionally for supplying the electric current to different points of the length of the anode wire. The insulation is then removed from parts of the conductor and the bare conductor part without being cut is wound tightly around the contact point on the anode wire and is thereafter embedded, for example, in a casting resin.

BACKGROUND OF THE INVENTION

The present invention relates to an internal anode for the cathodic rust protection of pipelines in which watery electrolytes are conducted.

For the above-mentioned purpose it is conventional to employ either self-consuming anodes of base metals, for example, of zinc or magnesium, which therefore have to be frequently replaced, or insoluble anodes of a more precious metal, for example, of titanium, tantalum, or niobium or alloys of these metals, when a foreign electric current flowing in the direction opposite to the electric corrosion current is superimposed upon the latter, in which case these anodes are coated or plated with metals of the platinum group. In place of solid anodes of these metals it is also possible to employ anodes which consist of a core of electrically highly-conductive metals, for example, copper, and of a layer of titanium, tantalum, niobium or alloys of these metals which is plated on this core, and of an additional coating of precious metals plated thereon. The particular advantage of employing such anodes which are coated with a layer of precious metals for pipelines for drinking water and water for general use consists in the fact that no soluble anode products will be formed which might affect the quality of the water.

Electrodes of the known types which are plated with precious metals are usually inserted in the form of rods into the pipeline in a direction transverse to the direction of flow and at a distance from each other which depends upon the specific resistance of the electrolyte. Apart from the fact that the provision of the numerous points of insertion of the electrodes into the pipeline which is to be protected increases the cost of such an installation very considerably, these points of insertion also endanger the safety of operation of the apparatus. Furthermore, the numerous anode rods extending transverse to the direction of flow produce eddy currents behind each rod and therefore a very turbulent flow within the pipeline.

It has for these reason also been impossible to employ such electrode arrangements successfully in pipelines of smaller diameters. The only way remaining for effecting a cathodic rust protection of such pipelines therefore consisted in stretching an anode wire which was plated with precious metal centrally through the pipeline in the longitudinal direction thereof so that the entire plated outer surface of this wire would operate as a protective anode. In order to prevent the anode wire from coming in contact with the wall of the pipe which would result in a short circuit, special spacing, supporting and tightening elements must be provided which especially in long pipelines are not only very expensive but can be installed in narrow pipelines only with very great difficulties and in most cases not at all with the required safety insofar as the insulation of the anode is concerned.

SUMMARY OF THE INVENTION

It is an object of the present invention to provide an internal anode construction for the cathodic rust protection of pipelines which not only eliminates the disadvantages of all previous anode arrangements but also results in improvements which hitherto were not attainable.

According to the invention it has been found that an excellent insulation of a wirelike anode which is plated with precious metal may be attained for protecting such an anode from coming in contact with the wall of a pipeline and for thus preventing short circuits by winding a rod or tube of plastic spirally around the anode. The characteristic feature of the present invention therefore consists in the provision of an internal anode for the cathodic rust protection of pipelines which consists of a wire anode of titanium, tantalum, niobium or alloys of these metals which is plated with a precious metal or of a tubular wire of these metals which has a core consisting of an electrically highly conductive material, and of an insulation in the form of a rod or tube which is wound in the form of a wide spiral around the anode wire so as to leave large uncovered areas between the turns of the spiral.

Although it is already known to draw a perforated flexible tube of an insulating material over an anode wire or to envelope the wire with a net fabric of plastic, these insulations have the great disadvantage of permitting only relatively short wires to be so insulated and of covering a considerable part of the surface of the wire anode so that this part will be no longer effective but completely useless for the intended purpose.

The advantages of the wire anode according to the invention over the anodes as were previously known including those as last-mentioned above consist primarily in the fact that the spirally wound insulation of plastic properly protects the wire anode from coming in contact with the wall of the pipe even if no additional spacing, supporting and tightening elements are provided, that is, when the wire anode extends freely through the pipeline. The new wire anode has the further advantage that its insulation does not impair the free surface of the wire which is plated with a precious metal and does not interfere with the flow of the protective current between the wire anode and the cathodic pipe wall. The new insulation also has the advantage over the known insulations of plastic as previously mentioned that the plastic spiral may also be applied continuously and without interruption on wires of a great length.

Instead of winding a tubular or rod-shaped insulation of plastic spirally around the wire anode in the manner as described above, the invention further provides that an insulated electric conductor be spirally wound around the wire anode for supplying the electric current to the latter. The insulation is for this purpose removed at certain parts from the conductor so as to provide the latter with contact points and the non-insulated conductor parts are then wrapped several times in the form of narrow coils tightly around the anode wire. For insulating the contact points safely from the pipe wall, an additional insulation is then applied around these parts, preferably by pouring a casting resin thereon. The electric conductor for supplying the current to the wire anode preferably consists of a copper wire which is covered by a layer of plastic.

The embodiments of the invention as last described has the particular advantage that the insulated current conductor which is spirally wound around the anode wire also serves as an insulating and spacing element for protecting the anode wire especially in narrow pipes from coming in contact with the inner wall surface of the pipe and for thus forming a reliable protection from short circuits. By providing the contact points at suitable distances from each other along the entire length of the anode wire, the further advantage is attained over the previous wire anodes that only a very few current lead-ins have to be provided in the wall of the pipeline, for example, only at every 500 to 1000 m., whereas previously four lead-ins were required for each 100 m. of pipeline. Consequently, not only the costs are considerably reduced since a much lower number of insulated lead-ins is now required, but it is also no longer necessary to provide an insulated main cable which had to be connected to the numerous current lead-ins and had to be passed outside of the pipeline through a cable trench.

For pipes of a large inner diameter, the present invention also permits the tightening means which maintain the wire anode centrally within the pipe and which were previously employed for also serving as current supply means to be made of normal structural steel and it no longer requires these tightening means to consist of metals such as titanium, tantalum, or niobium which become passive under anodic conditions.

The features and advantages of the present invention will become further apparent from the following short description of the accompanying drawings, in which FIGURES 1 and 2 show two different embodiments of the invention.

FIGURE 1 shows a section of an anode wire 1 which is stretched centrally through a pipe 6, as shown in cross section. Around the anode wire 1 a tubular or rod-shaped insulation 2 of plastic is wound in the form of a wide spiral. It is evident from this drawing that the plastic insulation 2 will space the anode wire 1 safely at any time from the wall of pipe 6 even if a relative displacement occurs between them and that since the insulation 2 is widely coiled around the anode wire 1, the effective outer surface of the anode wire is only slightly diminished by the insulation.

FIGURE 2 illustrates the modification of the invention as previously described, in which the wire-shaped anode 1 is likewise mounted within a pipe 6, as shown in cross section. Instead of a mere insulation 2 of plastic, as shown in FIGURE 2, an electric conductor 3 which is enclosed by a tube or covering of plastic is spirally wound around the anode wire 1. At suitable points 4 which may be spaced at any desired distances from each other, the plastic covering is removed from the conductor 3 and the bare wire 3' is wound several times tightly around the anode wire 1 so as to form a narrow coil, the adjacent turns of which engage each other and supply the necessary electric current to the anode wire 1. Each of these contact points 4 is embedded in an insulation 5 which preferably consists of casting resin and also covers the adjacent parts of the insulated conductor 3. This insulated conductor 3 therefore serves two functions, namely, as a safe and effective insulation for preventing any contact between the anode wire 1 and the pipe 6 and thus also any short circuit, and also for supplying the necessary current to the anode wire 1. The wire core within the insulation of this conductor 3 also solidifies and increases the spacing thickness of this insulation..

Although my invention has been illustrated and described with reference to the preferred embodiments thereof, I wish to have it understood that it is in no way limited to the details of such embodiments but is capable of numerous modifications within the scope of the appended claims.

Having thus fully disclosed by invention, what I claim is:

1. A wire anode for the cathodic rust protection of pipelines, comprising a precious metal-plated anode wire of a metallic conductor; and an insulating member wound continuously around said wire along the length thereof in the form of a spiral of widely spaced turns so as to leave uncovered areas of the anode wire between the turns of the insulating member spiral, said insulating member comprising a core consisting of an electric conductor and an insulating covering of plastic enveloping the electric conductor except at contact points spaced from each other at which points several closely adjacent turns of the bare electric conductor are tightly wound around said anode wire for supplying current thereto, and additional insulating means covering each of said contact points.

2. The wire anode of claim 1, wherein the additional insulating means consists of a layer of casting resin in which the contact point and the adjacent ends of the insulating covering are embedded.

References Cited

UNITED STATES PATENTS

| | | | |
|---|---|---|---|
| 915,846 | 3/1909 | Friedheim | 204—290 |
| 3,022,242 | 2/1962 | Anderson | 204—290 |
| 3,135,677 | 6/1964 | Fischer. | |
| 3,409,530 | 11/1968 | Locke et al. | 204—196 |

T. TUNG, Primary Examiner

U.S. Cl. X.R.

204—282, 290